Oct. 4, 1927.  
A. J. OTT ET AL  
INDEXING MECHANISM  
Filed May 18, 1925  
1,644,540  
5 Sheets-Sheet 1

Inventors  
Albert J. Ott  
Conrad L. Ott  
By  
Attorneys

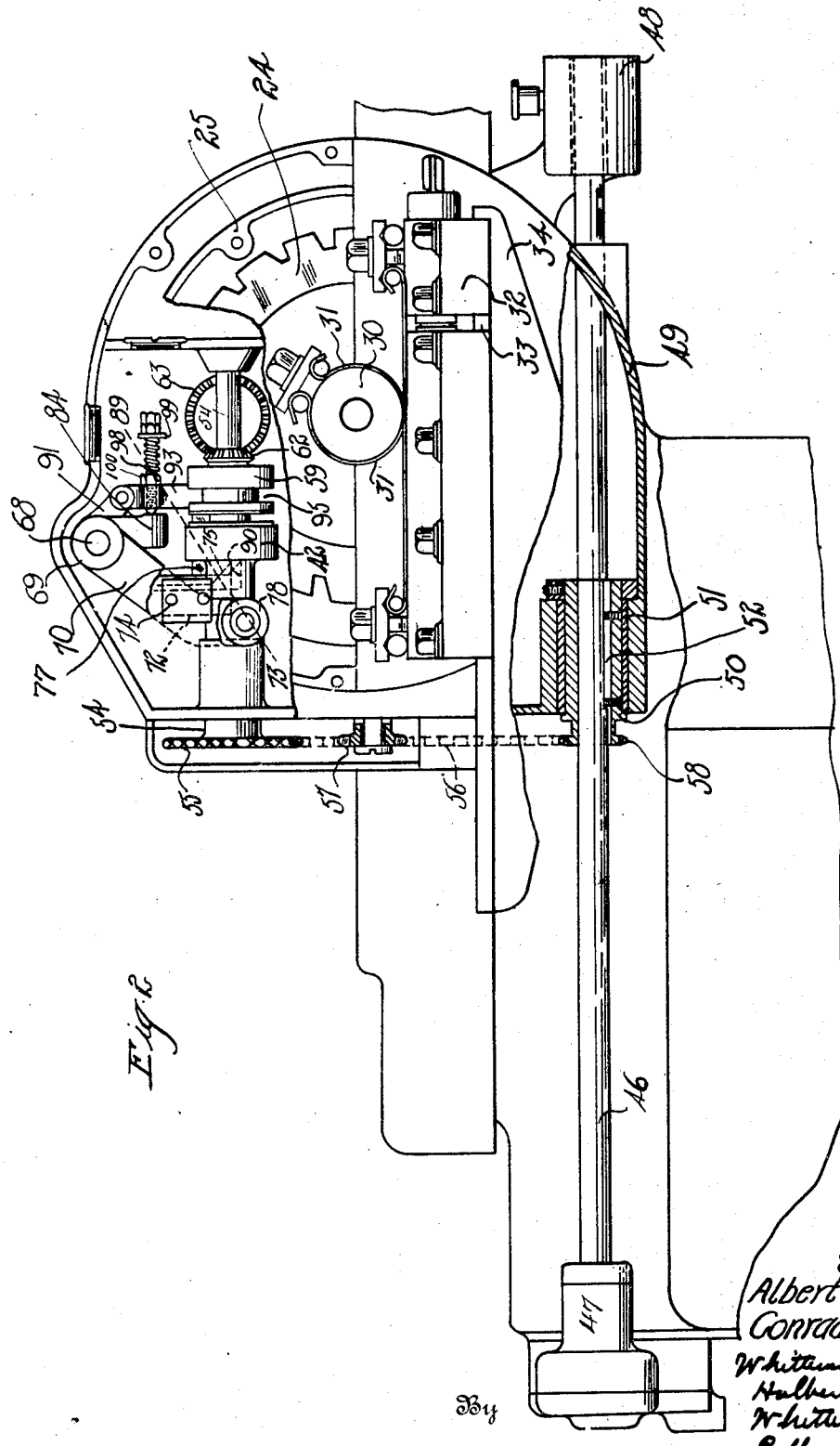

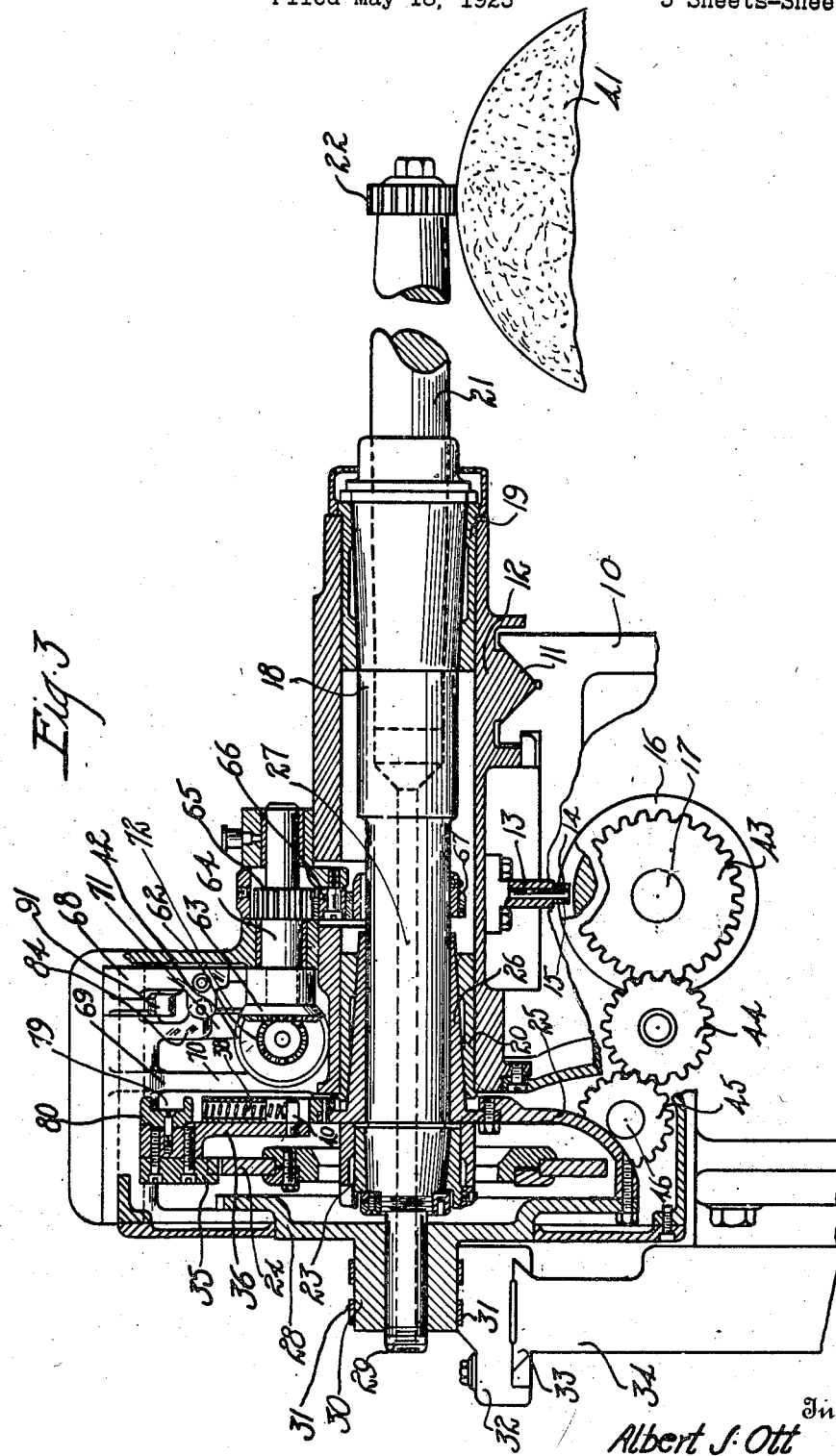

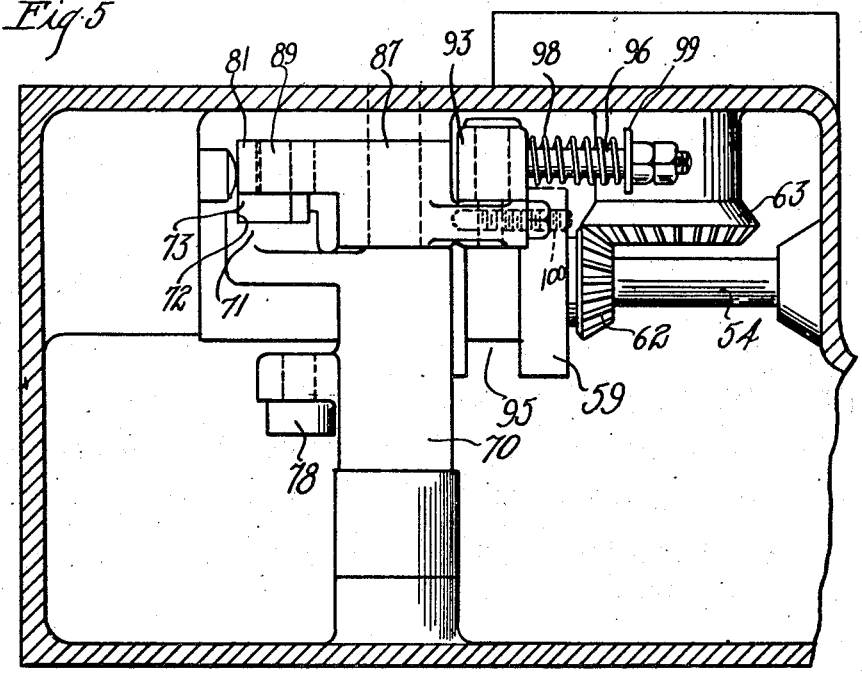
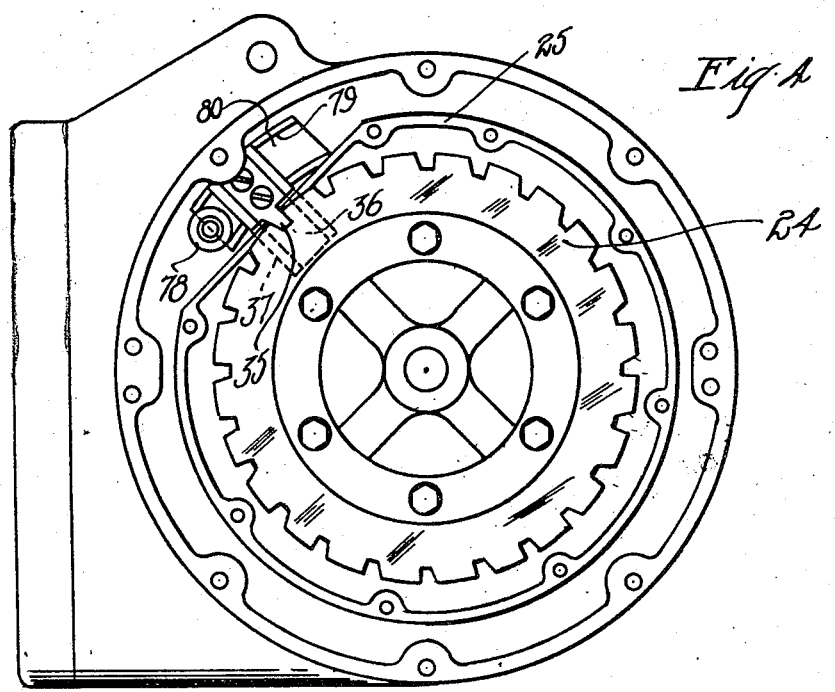

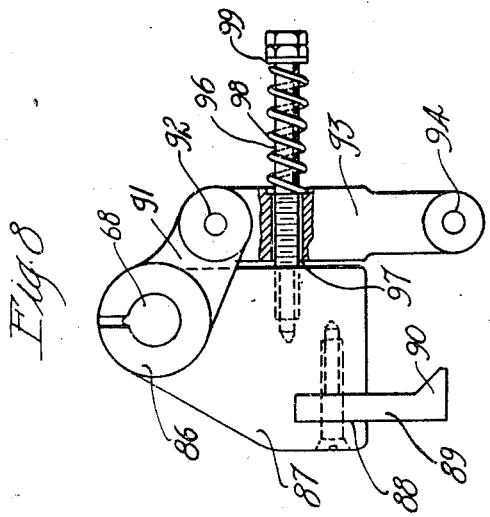
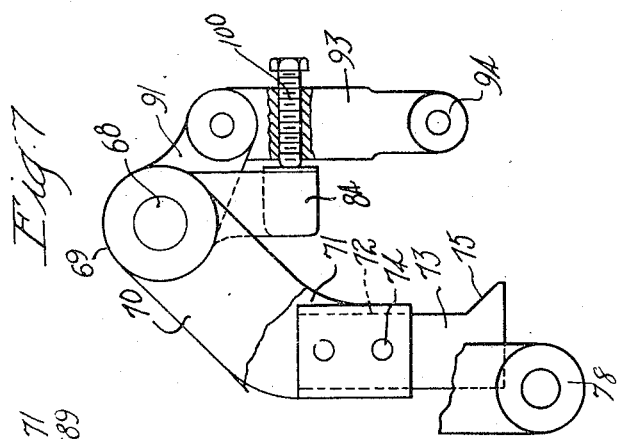
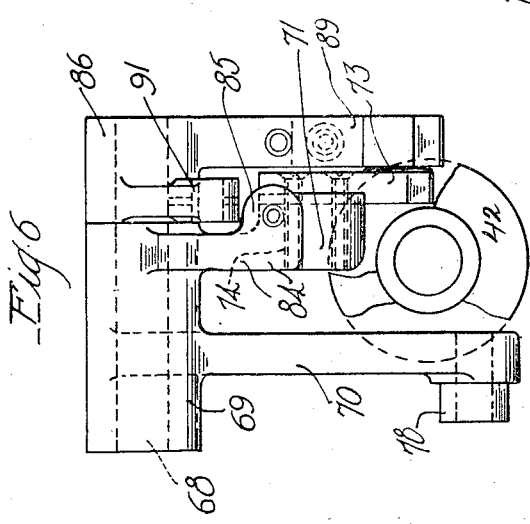

Patented Oct. 4, 1927.

1,644,540

UNITED STATES PATENT OFFICE.

ALBERT J. OTT AND CONRAD L. OTT, OF DETROIT, MICHIGAN, ASSIGNORS TO AMERICAN GRINDER COMPANY, OF DETROIT, MICHIGAN, A CORPORATION OF MICHIGAN.

INDEXING MECHANISM.

Application filed May 18, 1925. Serial No. 31,152.

The invention relates to an indexing mechanism adapted to be used with various types of machines, but designed particularly for a machine for grinding involute gear teeth by a generating process. Such a machine is illustrated in the accompanying drawings and comprises essentially a rotating grinding wheel journaled in the frame of the machine and a reciprocating carriage movable relative thereto, the carriage having transversely mounted thereon a work spindle oscillated by means of flexible tapes. The indexing mechanism is arranged between the work spindle and the oscillating mechanism therefor, and comprises a peripherally notched index plate secured to the spindle and normally driven by means of the flexible tapes through an index pawl engaging one of the notches of the plate. The indexing is accomplished by withdrawing the pawl from the index plate and permitting a relative movement of the parts until the pawl engages the next succeeding notch.

The machine as thus far described is similar to other machines of the prior art, such, for example, as that described in our co-pending application Serial Number 615,583, filed January 29, 1923. The novelty in our new invention resides principally in the mechanism for imparting the relative movement to the index plate and pawl.

One of the objects of the invention is the provision of an indexing mechanism capable of completing its indexing movement in a very short interval of time whereby the machine will have a greater portion of its cycle of operation devoted to the actual grinding of the work. Another object of the invention is to provide an indexing mechanism which can be actuated independently of the reciprocating carriage. Still another object is to provide a power lifted index pawl operated independently of the flexible tapes or other oscillating means for the spindle, whereby the tapes are relieved from any stresses incident to the indexing movement. A further object is the provision of means for independently rotating the index plate and work spindle during the period of indexing in the opposite direction from their normal movement whereby a smaller portion of the cycle is required for indexing. A still further object is the provision of a trip mechanism operating in timed relation to the main drive shaft of the machine, this trip mechanism serving to positively withdraw the index pawl from the index plate and at substantially the same time to cause the driving of the index plate in the reverse direction.

These and other objects are attained by the novel construction hereinafter more fully described and illustrated in the accompanying drawings wherein: —

Figure 2 is a rear view thereof partly in section;

Figure 3 is a transverse section taken mainly on the line 3—3 of Figure 1;

Figure 4 is a fragmentary view somewhat similar to Figure 2 showing the index plate and index pawl;

Figure 5 is an enlarged sectional plan view on the line 5—5 of Figure 2;

Figure 6 is a side view of the trip mechanism on an enlarged scale;

Figure 1:
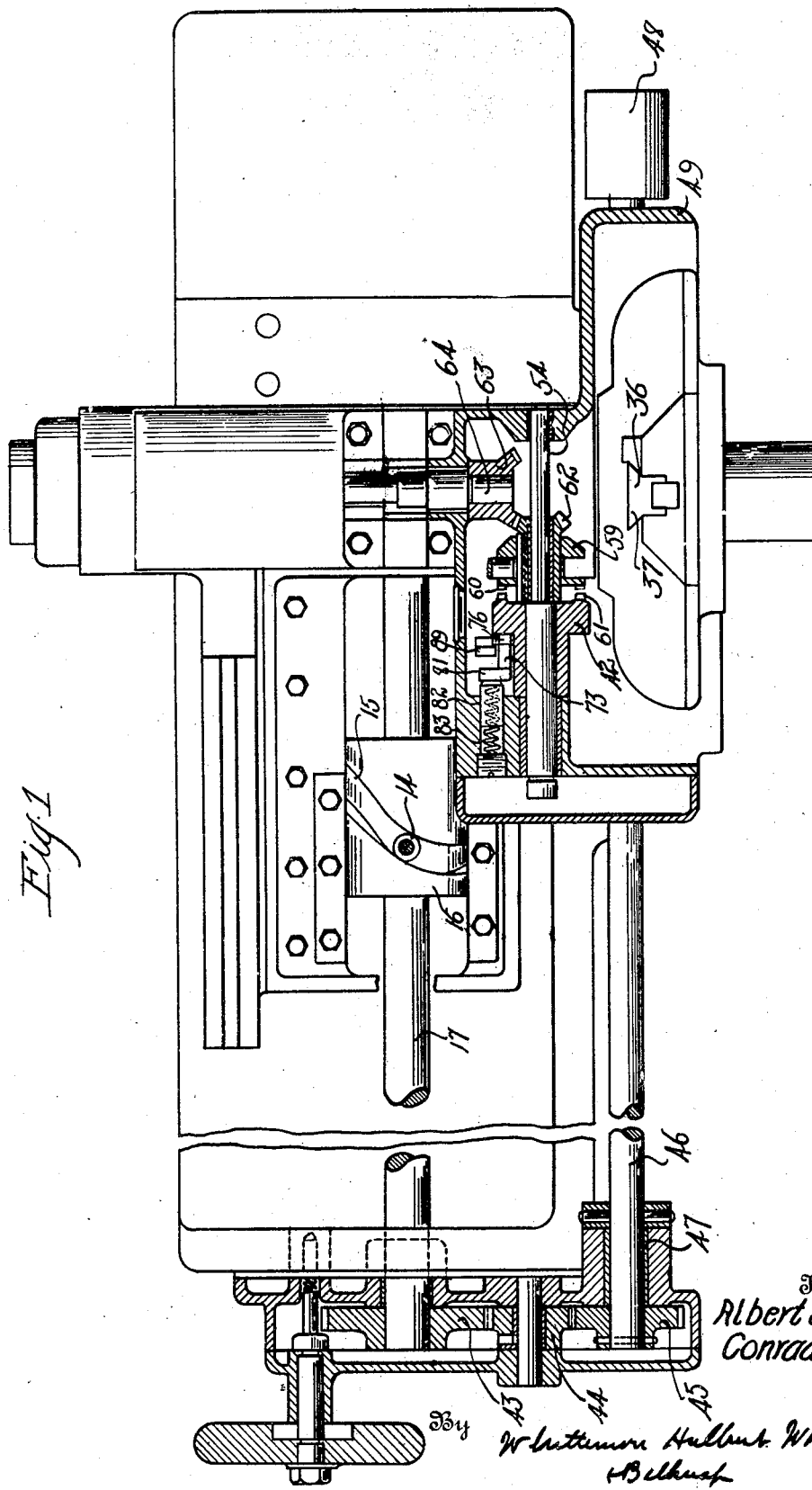
Figure 1 is a fragmentary plan view of a grinding machine provided with the improved indexing mechanism.

Figures 7 and 8 are fragmentary views at right angles to Figure 6 showing the levers 69 and 86.

The grinding machine to which our indexing mechanism is applied as illustrated in the drawings, comprises in general a frame 10 having the longitudinal guide ways 11 on which the carriage 12 reciprocates, the latter being driven through a depending arm 13 carrying a roller 14 engaging the cam slot 15 of a cam drum 16. The drum is mounted on a shaft 17 journaled in the frame and driven by suitable means (not shown). Mounted transversely on the carriage 12 is a hollow spindle 18 journaled in the tapered bearings 19 and 20 and supporting at one end the arbor 21 on which the gear 22 is suitably clamped. A hub 23 is secured to the other end of the spindle 18 and carries a notched index plate 24. 25 is a rotatable index housing surrounding the index plate 24 and rotatably mounted on the spindle 18 by means of a projecting sleeve 26 inserted between the tapered bearing 20 and the cylindrical portion 27 of the spindle. An index cover plate 28 secured to the index housing 25 is rotatably mounted on the outer end 29 of the spindle and carries a cylinder 30 around which are wrapped the flexible steel tapes 31. These tapes extend in opposite directions and are anchored upon an adjustable table 32, the latter being longitudinally slidable upon the guide ways 33 upon an upwardly extending portion 34 of the frame 10.

The index housing 25 is normally connected to the index plate 24 by means of an index pawl 35, the latter being carried by a slide 36 movable radially in the guide ways 37 of the index housing. For normally maintaining the pawl 35 in engagement with the index plate there is a spring 38 having one end abutting a shoulder 39 in the index housing and the other end bearing against an arm 40 projecting laterally from the slide 36.

With the mechanism as thus far described, it will be apparent that rotation of the cam drum 16 will impart a reciprocation to the carriage 12 while the tapes 31 will cause the spindle 18 to be simultaneously oscillated in such a manner as to impart a generating movement to the gear 22. It will be understood, of course, that this generating movement is utilized for grinding one side of a gear tooth by means of the rotating grinder wheel 41.

The indexing of the machine is accomplished during the portion of the cycle when the gear 22 is being rolled out of engagement with the grinding wheel 41. For this purpose there is employed a trip mechanism actuated by a rotatable cam 42 driven in timed relation to the drum cam 16. The mechanism for rotating the cam 42 comprises a gear 43 keyed to the shaft 17 which drives an idler gear 44, the latter being in mesh with a gear 45 on a countershaft 46, which in turn is journaled in bearings 47 and 48 on the frame and extends through the lower portion of the stationary index housing 49 on the carriage 12. A sleeve 50 is journaled in bearings 51 in the lower portion of the housing 49 and is adapted to slide on the shaft 46 while being at all times non-rotatably secured thereto by the key 52 engaging the slot 53 in the shaft. The housing 49 has mounted in the upper portion thereof a shaft 54 carrying at one end thereof a sprocket 55. 56 is a chain passing around the sprocket 55, the idler sprocket 57 and a driving sprocket 58, the latter being secured to the sleeve 50. The cam 42 is fixedly mounted on the shaft 54 and is, therefore, driven in timed relation to the cam drum 16, the gearing being such that the cams both rotate at the same speed. 59 is a clutch sleeved upon the shaft 54 and having the clutch teeth 60 on one face thereof adapted to engage corresponding clutch teeth 61 on the adjacent face of the cam 42. This clutch is normally disengaged from the cam 42. A bevel gear 62 secured to the clutch 59 meshes with a bevel gear 63 on a shaft 64 journaled parallel to the spindle 18. The shaft carries a spur gear 65 meshing with an idler 66 which, in turn, meshes with a gear 67 fixedly secured on the spindle 18.

The trip mechanism comprises a series of levers rockable upon a shaft 68 extending transversely of the stationary index housing. One lever 69 has two arms depending therefrom, designated as 70 and 71 respectively. The arm 71 is slotted at 72 and has inserted therein a cam lever 73 rigidly attached thereto by the machine screws 74 and having at it lower end the inclined cam surface 75. This cam surface 75 is so arranged as to be in the path of a lug 76 on the cam 42, this lug having the tapering cam surface 77 adapted to engage the cam surface 75 and thereby cause the lever 69 to be rocked about the pivot shaft 68.

The other arm 70 of the lever 69 carries at its lower end a roller 78 which is adapted to enter a segmental slot 79 in a segment 80 attached to the slide 36. The arrangement of the parts is such that the segment 80 which is carried by the rotatable index housing 25 engages the roller 78 just prior to the engagement of the cam lug 76 with the cam surface 75 so that when the latter engagement takes place, the movement of the lever 69 will cause the roller 78, segment 80 and index pawl 35 to be moved radially outward and thus disengage the index plate from its normal driving mechanism.

The cam lever 73 has a laterally extending portion 81 against which bears a plunger 82 under the influence of a spring 83. The lever 69 has a third depending arm 84 provided with a lateral extension 85, the function of which is hereinafter explained.

A second lever 86 is mounted on the shaft 68 and is provided with a depending arm 87 having a slot 88 therein in which is inserted a second cam lever 89. The latter is adjacent the cam lever 73 and provided with a similar inclined surface 90 set slightly below the cam surface 75 so as to be actuated by the cam lug 76 slightly later than the cam lever 73. The lever 86 is also provided with an arm 91, the latter being pivotally connected by a pin 92 to a clutch lever 93. A roller 94 at the lower end of the clutch lever 93 engages annular groove 95 in the clutch 59. 96 is a rod threadedly engaging the arm 87 and extending through an aperture 97 in the clutch lever 93. A spring 98 is sleeved upon the rod 96 and has one end bearing against the clutch lever 93, the other end abutting the collar 99. Thus, when the cam dog 76 trips the cam lever 89, the lever 86 is rocked on the shaft 68 thereby increasing the tension of the spring 98 and resiliently urging the clutch lever 93 to shift the clutch 59. In order to prevent the shifting of the clutch lever 93 before the index pawl 35 is disengaged from the notched index plate, the lever 93 is provided with an adjustable stop 100 engaging the arm 84 of the lever 69.

The clutch 59 is preferably provided with only three clutch teeth for engaging the corresponding teeth on the cam 42, these three teeth being preferably adjacent so as to eliminate any possibility of inaccurate spacing.

The operation of the indexing mechanism is as follows: The index plate 24 and index housing 25 are normally oscillated in a counter-clockwise direction in Figure 2 as the gear is being withdrawn from contact with the grinder wheel. The setting of the cam dog 76 is such that it contacts with the cam surface 75 as soon as the work has sufficient clearance with the grinder wheel to allow the index movement to take place. The dog 76 in striking the cam surface 75 causes the lever 69 to be rocked upon the shaft 68 and since the roller 78 has entered the segmental slot 79, just prior to the rocking movement of the lever, the slide 36 is moved radially outward thus disengaging the index pawl 35 from the index plate 24. The cam dog 76 strikes the second cam lever 89 an instant later, thereby rocking the second lever 86 which through the medium of the spring 98 shifts the clutch lever 93 and engages the clutch teeth 60 with teeth 61 on the rotating cam 42. The spindle 18 and index plate 24, are, therefore, driven by means of the gears 62, 63, 65, 66 and 67, this causing the index plate to be rotated in a clockwise direction. After the index plate has begun its reverse rotation the cam dog 76 rides off the cam levers 73 and 89, but the index pawl 35 now rides on the periphery of the index plate 24 until the next succeeding notch is reached when it is resiliently urged inward by the spring 38. This permits the lever 69 to resume its normal position because of the tension of the spring 83 whereupon the arm 84 acting through the stop 100 disengages the clutch 59 and allows the index plate 24 to once more be driven by the index pawl 35.

What we claim as our invention is:—

1. In a machine of the class described, a rotatable spindle, means for oscillating the same, and means for rotating said spindle oppositely to said oscillating means during a portion of the cycle to effect an indexing movement.

2. In a machine of the class described, a rotatable spindle, an oscillating member normally connected to said spindle for driving the latter, means for disconnecting said oscillating member from said spindle during the oscillation thereof in one direction, and means independent of said oscillating member for rotating said spindle in the opposite direction while disconnected from said oscillating member.

3. In a machine of the class described, a rotatable spindle, a notched plate secured thereto, an oscillating member adjacent said plate, an index pawl on said member normally engaging said plate, means for withdrawing said pawl from said plate, and means for independently rotating said spindle oppositely to the rotation of said oscillating member to effect an indexing movement relative to said oscillating member while said pawl is withdrawn.

4. In a machine of the class described, a rotatable spindle, an oscillating member, a device normally connecting said spindle and said oscillating member, and means mounted independently of said oscillating member for disconnecting said spindle from said device.

5. In a machine of the class described, a rotatable spindle, an oscillating member, a device normally connecting said spindle and oscillating member, a rotatable shaft mounted independently of said oscillating member, means for rotating said shaft, a cam on said shaft and mechanism operated by said cam for withdrawing said pawl.

6. In a machine of the class described, a rotatable spindle, an oscillating member, a device normally connecting said spindle and oscillating member, a rotatable shaft mounted independently of said oscillating member, means for driving said shaft, a cam on said shaft, a clutch normally disconnected from said shaft, gearing between said clutch and said spindle, and mechansim operated by said cam for withdrawing said pawl and connecting said clutch to said shaft whereby said spindle is rotated oppositely from said oscillating member.

7. In a machine of the class described, a reciprocating carriage, a rotatable spindle journaled thereon, an oscillating member also journaled on said carriage, means for oscillating said member in timed relation to the reciprocation of said carriage, an index plate, a cooperating index pawl normally engaging said plate, one of said cooperating members being carried by said oscillating member and the other by said rotating spindle, means for withdrawing said index pawl from said plate, and means for rotating said spindle oppositely to said oscillating member while said pawl is withdrawn.

8. In a machine of the class described, a frame, a carriage slidable thereon, means for reciprocating said carriage, a rotatable spindle journaled on said carriage, an oscillating member also journaled on said carriage, an index plate secured to said spindle, an index pawl normally engaging said plate, said pawl being radially slidable in said oscillating member, a cylinder on said oscillating member, tapes wrapped around said cylinder and anchored to said frame, means operated independently of said carriage for withdrawing said pawl, and means for rotating said spindle oppositely to said oscillating member while said pawl is withdrawn.

9. In a machine of the class described, the combination with a rotatable spindle having a notched index plate secured thereto, of an oscillating index housing, an index pawl radially slidable in said housing normally engaging said index plate, a shaft driven independently of said oscillating housing, a clutch loosely mounted on said shaft, gearing between said clutch and said spindle, a cam fixed to said shaft having teeth engageable with said clutch, a cam lug on said cam, and means actuated by said cam for moving said pawl radially outward, and engaging said clutch with said teeth whereby said spindle is rotated relative to said housing.

10. In a machine of the class described a frame, a reciprocating carriage, a spindle journaled on said carriage having secured thereto a notched index plate, an index housing surrounding said index plate, a cylinder secured to said housing, tapes wrapped around said cylinder and anchored to said frame, an index pawl radially slidable in said housing, and having a segmental slot therein, resilient means urging said pawl toward said index plate, a rock arm pivoted to said carriage having a roller adapted to engage said slot, a rotatable cam adapted to actuate said rock arm, a power driven shaft, a gear train between said shaft and said spindle, a clutch intermediate said gear train and said shaft, means for resiliently engaging said clutch, and a stop on said rock arm for controlling the movement of said clutch whereby said spindle is rotated oppositely to said index housing upon the withdrawal of said pawl.

11. In a machine of the class described, the combination with a frame, of a carriage slidable thereon, a spindle journaled on said carriage, an index plate secured to said spindle, a rotatable index housing on said carriage, tapes for oscillating said housing in timed relation to said carriage, an index pawl radially slidable in said rotatable housing, resilient means urging said pawl into engagement with said index plate, a non-rotatable housing on said carriage, a splined shaft extending through said non-rotatable housing and journaled on said frame, gearing on said carriage driven by said splined shaft, a cam shaft driven by said gearing, a clutch for rotatably connecting said cam shaft with said spindle, and a trip mechanism actuated by said cam shaft for withdrawing said pawl and engaging said clutch to drive said spindle oppositely from said rotatable housing.

12. In a machine of the class described, a reciprocating carriage, a rotatable spindle journaled thereon, an oscillating member also journaled on said carriage, means for oscillating said member in timed relation to the reciprocation of said carriage, a notched index plate, a cooperating index plunger engageable with said plate, one of said cooperating members being carried by said spindle and the other by said oscillating member and means for rotating said spindle oppositely to said oscillating member during a portion of the cycle of reciprocation to effect an indexing movement.

13. In a machine of the class described, a rotatable member, an oscillatory member, means for oscillating said oscillatory member, means for intermittently connecting and disconnecting said oscillatory member to said rotatable member, and means for rotating said rotatable member in a direction opposite to the rotation of said oscillatory member during the interval when said rotatable member is disconnected from said oscillatory member.

14. In a machine of the class described, an indexing plate, a cooperating index plunger, means for oscillating one of said cooperating members, means for withdrawing said plunger from said plate, and means operating while said plunger is withdrawn for rotating the other of said cooperating members in a direction opposite to the rotation of the first cooperating member.

15. In a machine of the class described, a non-oscillatory frame, a rotatable spindle journaled in said frame, an oscillatory member also journaled in said frame, means normally connecting said oscillatory member to said rotatable spindle, means for disconnecting said spindle from said oscillatory member, and means operating while said oscillatory member is disconnected for rotating said spindle relative to said non-oscillatory frame in a direction opposite to the rotation of said oscillatory member relative to said frame.

16. In a machine of the class described, a non-oscillatory frame, a spindle member journaled therein, an oscillatory member also journaled therein concentrically of said spindle member, an index plate carried by one of said members, a cooperating plunger carried by the other of said members, a shaft journaled in said non-oscillatory frame, means for rotating said shaft, mechanism operated by said shaft for withdrawing said plunger, and mechanism operated by said shaft while said plunger is withdrawn for rotating said spindle member oppositely to said oscillating member.

In testimony whereof we affix our signatures.

ALBERT J. OTT.
CONRAD L. OTT.

DISCLAIMER.

1,644,540.—*Albert J. Ott* and *Conrad L. Ott*, Detroit, Mich. INDEXING MECHANISM. Patent dated October 4, 1927. Disclaimer filed May 14, 1928, by the assignee, *American Grinder Company*.

Hereby enter this disclaimer to the claims of said Letters Patent which are in the following words, to wit:

"1. In a machine of the class described, a rotatable spindle, means for oscillating the same, and means for rotating said spindle oppositely to said oscillating means during a portion of the cycle to effect an indexing movement."

"3. In a machine of the class described, a rotatable spindle, a notched plate secured thereto, an oscillating member adjacent said plate, an index pawl on said member normally engaging said plate, means for withdrawing said pawl from said plate, and means for independently rotating said spindle oppositely to the rotation of said oscillating member to effect an indexing movement relative to said oscillating member while said pawl is withdrawn.

"4. In a machine of the class described, a rotatable spindle, an oscillating member, a device normally connecting said spindle and said oscillating member, and means mounted independently of said oscillating member for disconnecting said spindle from said device."

"13. In a machine of the class described, a rotatable member, an oscillatory member, means for oscillating said oscillatory member, means for intermittently connecting and disconnecting said oscillatory member to said rotatable member, and means for rotating said rotatable member in a direction opposite to the rotation of said oscillatory member during the interval when said rotatable member is disconnected from said oscillatory member.

"14. In a machine of the class described, an indexing plate, a cooperating index plunger, means for oscillating one of said cooperating members, means for withdrawing said plunger from said plate, and means operating while said plunger is withdrawn for rotating the other of said cooperating members in a direction opposite to the rotation of the first cooperating member.

"15. In a machine of the class described, a non-oscillatory frame, a rotatable spindle journaled in said frame, an oscillatory member also journaled in said frame, means normally connecting said oscillatory member to said rotatable spindle, means for disconnecting said spindle from said oscillatory member, and means operating while said oscillatory member is disconnected for rotating said spindle relative to said non-oscillatory frame in a direction opposite to the rotation of said oscillatory member relative to said frame."

[*Official Gazette May 29, 1928.*]